(12) United States Patent
Mao et al.

(10) Patent No.: US 9,456,226 B2
(45) Date of Patent: Sep. 27, 2016

(54) DYNAMIC CONTENT PACKAGING IN A CONTENT DELIVERY SYSTEM

(76) Inventors: Weidong Mao, West Windsor, NJ (US); Sree Kotay, Philadelphia, PA (US)

(*) Notice: Subject to any disclaimer, the term of this patent is extended or adjusted under 35 U.S.C. 154(b) by 0 days.

(21) Appl. No.: 13/496,338

(22) PCT Filed: Sep. 15, 2010

(86) PCT No.: PCT/US2010/048975
§ 371 (c)(1),
(2), (4) Date: Apr. 26, 2012

(87) PCT Pub. No.: WO2011/034956
PCT Pub. Date: Mar. 24, 2011

(65) Prior Publication Data
US 2012/0222063 A1   Aug. 30, 2012

Related U.S. Application Data (60) Provisional application No. 61/242,444, filed on Sep. 15, 2009, provisional application No. 61/242,456, filed on Sep. 15, 2009.

(51) Int. Cl.
G06F 15/173 (2006.01)
H04N 7/167 (2011.01)
(Continued)

(52) U.S. Cl.
CPC ......... H04N 21/21 (2013.01); H04L 47/2433 (2013.01); H04L 63/0428 (2013.01);
(Continued)

(58) Field of Classification Search
CPC ........... H04L 67/1021; H04L 67/1014; H04L 63/0428; H04L 67/303; H04L 47/2433; H04H 60/44; H04N 21/25841; H04N 21/643; H04N 21/6408; H04N 21/472; H04N 21/2343; H04N 21/6405; H04N 21/4353; H04N 21/64723; H04N 21/4524; H04N 21/24; H04N 7/17318; H04N 21/21; H04N 21/266; H04N 21/2389; H04N 21/2368; H04N 21/2365
USPC ........ 709/238, 240; 725/31, 87, 91, 96, 103, 725/114
See application file for complete search history.

(56) References Cited

U.S. PATENT DOCUMENTS 7,428,725 B2 * 9/2008 Niyogi et al. ............... 717/109
7,567,671 B2 * 7/2009 Gupte ......................... 380/239
(Continued)

FOREIGN PATENT DOCUMENTS

| EP | 1376990 A2 | 1/2004 |
|---|---|---|
| WO | 2004/029771 A2 | 4/2004 |
| WO | 2014004787 A1 | 1/2014 |

OTHER PUBLICATIONS

International Search Report for PCT/US2010/048974, mailed Nov. 3, 2010.
(Continued)

Primary Examiner — Hoang-Vu A Nguyen-Ba
(74) Attorney, Agent, or Firm — Banner & Witcoff, Ltd.

(57) ABSTRACT

To be accessed on different media players, requested content must be delivered in a format that is supported by the requesting device. A dynamic content packager for encrypting and packaging requested content for different requesting devices at the time of consumption is disclosed.

20 Claims, 7 Drawing Sheets

(51) Int. Cl.
| | |
|---|---|
| H04N 7/173 | (2011.01) |
| H04N 21/21 | (2011.01) |
| H04L 29/08 | (2006.01) |
| H04L 29/06 | (2006.01) |
| H04N 21/2343 | (2011.01) |
| H04N 21/472 | (2011.01) |
| H04N 21/6405 | (2011.01) |
| H04N 21/6408 | (2011.01) |
| H04N 21/643 | (2011.01) |
| H04N 21/2365 | (2011.01) |
| H04N 21/2368 | (2011.01) |
| H04N 21/2389 | (2011.01) |
| H04N 21/266 | (2011.01) |
| H04N 21/258 | (2011.01) |
| H04N 21/435 | (2011.01) |
| H04N 21/647 | (2011.01) |
| H04N 21/24 | (2011.01) |
| H04L 12/851 | (2013.01) |
| H04H 60/44 | (2008.01) |

(52) U.S. Cl.
CPC ....... *H04L67/1014* (2013.01); *H04L 67/1021* (2013.01); *H04L 67/303* (2013.01); *H04N 7/17318* (2013.01); *H04N 21/2343* (2013.01); *H04N 21/2365* (2013.01); *H04N 21/2368* (2013.01); *H04N 21/2389* (2013.01); *H04N 21/24* (2013.01); *H04N 21/25841* (2013.01); *H04N 21/266* (2013.01); *H04N 21/4353* (2013.01); *H04N 21/472* (2013.01); *H04N 21/643* (2013.01); *H04N 21/6405* (2013.01); *H04N 21/6408* (2013.01); *H04N 21/64723* (2013.01); *H04H 60/44* (2013.01)
USPC .............. 709/240; 709/238; 725/31; 725/87; 725/91; 725/96; 725/103; 725/114

(56) References Cited

U.S. PATENT DOCUMENTS

| | | | | |
|---|---|---|---|---|
| 7,653,687 B2* | 1/2010 | Reisman | ........................ | 709/203 |
| 7,747,720 B2 | 6/2010 | Toebes et al. | | |
| 8,060,631 B2* | 11/2011 | Collart et al. | ................ | 709/229 |
| 8,146,157 B2* | 3/2012 | Meier et al. | ..................... | 726/22 |
| 8,219,134 B2 | 7/2012 | Maharajh et al. | | |
| 8,234,301 B2* | 7/2012 | Kii et al. | ...................... | 707/781 |
| 8,527,639 B1 | 9/2013 | Liskov et al. | | |
| 8,548,946 B2* | 10/2013 | Hughes, Jr. | .................. | 707/636 |
| 2002/0091760 A1 | 7/2002 | Rozen | | |
| 2003/0028890 A1 | 2/2003 | Swart et al. | | |
| 2003/0236895 A1* | 12/2003 | Ohkubo et al. | ................ | 709/229 |
| 2004/0054786 A1 | 3/2004 | Kjellberg et al. | | |
| 2004/0205221 A1* | 10/2004 | Yamanaka et al. | ........... | 709/231 |
| 2004/0249768 A1 | 12/2004 | Kontio et al. | | |
| 2005/0010963 A1 | 1/2005 | Zeng et al. | | |
| 2005/0188048 A1 | 8/2005 | Yuan et al. | | |
| 2007/0153825 A1 | 7/2007 | Cho et al. | | |
| 2007/0168523 A1 | 7/2007 | Jiang et al. | | |
| 2007/0183441 A1 | 8/2007 | Medin | | |
| 2007/0220573 A1 | 9/2007 | Chiussi et al. | | |
| 2007/0232221 A1 | 10/2007 | Miyata | | |
| 2007/0294733 A1 | 12/2007 | Aaron et al. | | |
| 2008/0140850 A1 | 6/2008 | Gade et al. | | |
| 2008/0160956 A1* | 7/2008 | Jackson et al. | ................ | 455/406 |
| 2009/0077254 A1 | 3/2009 | Darcie et al. | | |
| 2009/0106792 A1 | 4/2009 | Kan et al. | | |
| 2009/0168679 A1 | 7/2009 | Benjamim et al. | | |
| 2009/0248886 A1 | 10/2009 | Tan et al. | | |
| 2009/0307307 A1 | 12/2009 | Igarashi | | |
| 2010/0017824 A1 | 1/2010 | Malik | | |
| 2010/0095012 A1* | 4/2010 | Zuckerman | ......... | H04L 67/1002 709/231 |
| 2010/0153573 A1 | 6/2010 | Huang | | |
| 2010/0239086 A1 | 9/2010 | Johnston et al. | | |
| 2010/0312857 A1 | 12/2010 | Ehlers | | |
| 2011/0083153 A1 | 4/2011 | Cedervall et al. | | |
| 2011/0141218 A1* | 6/2011 | Stancato | ................. | G06F 21/10 348/14.01 |
| 2011/0202965 A1 | 8/2011 | Henry et al. | | |
| 2011/0252115 A1 | 10/2011 | Karlsson et al. | | |
| 2013/0024582 A1 | 1/2013 | Rodrigues | | |
| 2013/0268577 A1 | 10/2013 | Oyman | | |

OTHER PUBLICATIONS

Search Report from PCT/US2010/048975.
Partial Supplementary European Search Report—EP Application 10817785.8—Dated Feb. 19, 2015.
Rakesh Mohan et al. "Adapting Multimedia Internet Content for Universal Access." IEEE Transactions on Multimedia, IEEE Service Center, Piscataway, NJ, US. Mar. 1, 1999.
Extended European Search Report—EP Application 10817786.6-1905—Dated Feb. 4, 2015.
European Search Report—EP App. 10817785.8—mailed Jun. 25, 2015.
Response to European Office Action—EP 10817786.6—Dated Aug. 19, 2015.
Jan. 21, 2016—(EP) Response to European Search Report—App 10817785.8.

* cited by examiner

DYNAMIC CONTENT PACKAGING IN A CONTENT DELIVERY SYSTEM

CROSS-REFERENCE TO RELATED APPLICATIONS

The present application claims priority to U.S. Provisional Application No. 61/242,444, entitled "IP Video Service Delivery Reference Architecture," filed Sep. 15, 2009, and to U.S. Provisional Application No. 61/242,456, entitled "TV Anywhere Architecture," filed Sep. 15, 2009, the contents of which are hereby incorporated by reference as non-limiting example embodiments.

BACKGROUND

Content providers distribute content, services, and other information to a user's premises via an information distribution network using various protocols. Users at the premises are increasingly demanding a greater variety of content, services, and other information at a faster response time. This has led to a growing collection of management schemes and protocols used throughout a distribution network. The content to be delivered may be encrypted depending upon the content and/or service. In addition, users may want to receive content in different formats depending on the device being used for accessing received content. Users may also want to access the same content at different times on different devices. For example, users may access content for use on a portable device during a particular time period and access the same content via a second device such as a stationary device during a second time period. This may occur, for example, when a user starts to watch a video on a mobile device and returns home to finish watching the remaining video content on a home television.

Thus, to support different devices, content may be converted into different formats so that users may access and utilize the content on different media devices. Storing multiple formats of the same content for delivery to users utilizing different devices requires large amounts of storage, provides increased operational cost for preprocessing of the content into different formats, and may not provide content for new device formats which may be introduced into the market. Thus, there is an ever present need for efficient solutions for providing content to numerous different devices without storing the sane content in numerous different formats.

SUMMARY

The features described herein generally relate to a dynamic content packager for encrypting and packaging requested content for different requesting devices at the time of consumption. A content packager which may reside at the ingress or egress of a content delivery network provides the requested content along a determined content delivery route.

In an exemplary embodiment, a device location and profile of a requesting device may be determined. Based on the requesting device location and profile, at least one content packager may be determined. A content path may be determined along which the at least one content packager resides. Encryption keys and packaging metadata may be retrieved to encrypt, transcode, and segment the requested content for the requesting device. The requested content may be delivered to the requesting device along the determined content delivery route.

Additional aspects of the disclosure relate to determining that the requested content already resides in resident cache located along the determined content delivery route. The content packager may cache the first requested content for each different requesting device format for future delivery to subsequent requesting devices.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
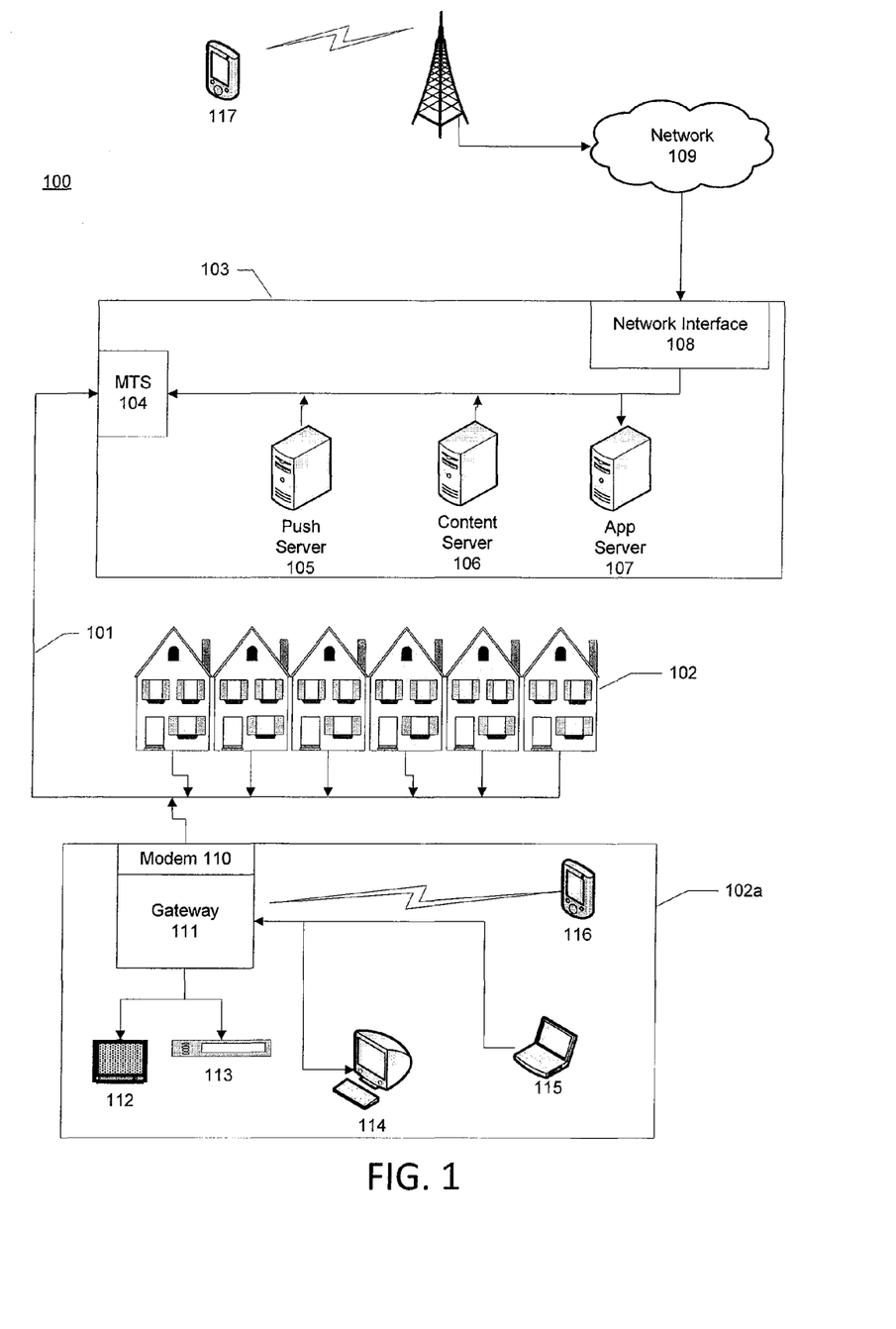
FIG. 1 illustrates an example information distribution network on which features of the disclosure may be implemented.

FIG. 1 illustrates an example content (e.g., data, media, information, services, etc.), distribution network 100 on which many of the various features described herein may be implemented. Network 100 may be any type of information distribution network, such as satellite, telephone, cellular, wired or wireless, etc. One example may be an optical fiber network, a coaxial cable network or a hybrid fiber/coax (HFC) distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103 (e.g., a headend, a processing facility, etc.). The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, white other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The various premises 102 may be connected (through wiring and/or wireless connections) to one another, forming a local premises access network operationally distinct from another local access network. The connected homes forming a local premises access network may be located near one another, such as neighboring townhomes, individual apartments in a downtown highrise, or the like. For example, a local premises access network may include the various premises 102. Another group of homes (now shown) may form a separate local premises access network. The local premises access network of the various premises 102 may be identifiable front the separate local premises access network. A local premises access network may also be associated with a particular geographic region (e.g., city, county, geographic area etc.). In some embodiments, homes connected to a termination system (TS), such as a modem termination system (MTS), may form a local premises access network.

The central office 103 may include a termination system (TS) 104, such as a cable modem termination system (CMTS) in an example of a HFC-type network, which may be a computing device configured to manage communications between devices on the network of lines 101 and backend devices such as servers 105-107 (to be discussed further below). In the example of an HFC-type network, the MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, Internet Protocol (IP) networks having Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones 117.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that are configured to provide content to users in the homes. This content may be, for example, video on demand movies, television programs, songs, services, information, text listings, etc. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The central office 103 may also include one or more application servers 107. An application server 107 may be a computing device configured to offer any desired service, and may run various languages and operating systems. For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102.

An example premises 102a may include a modem 110 (or another receiver and/or transmitter device suitable for a particular network), which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
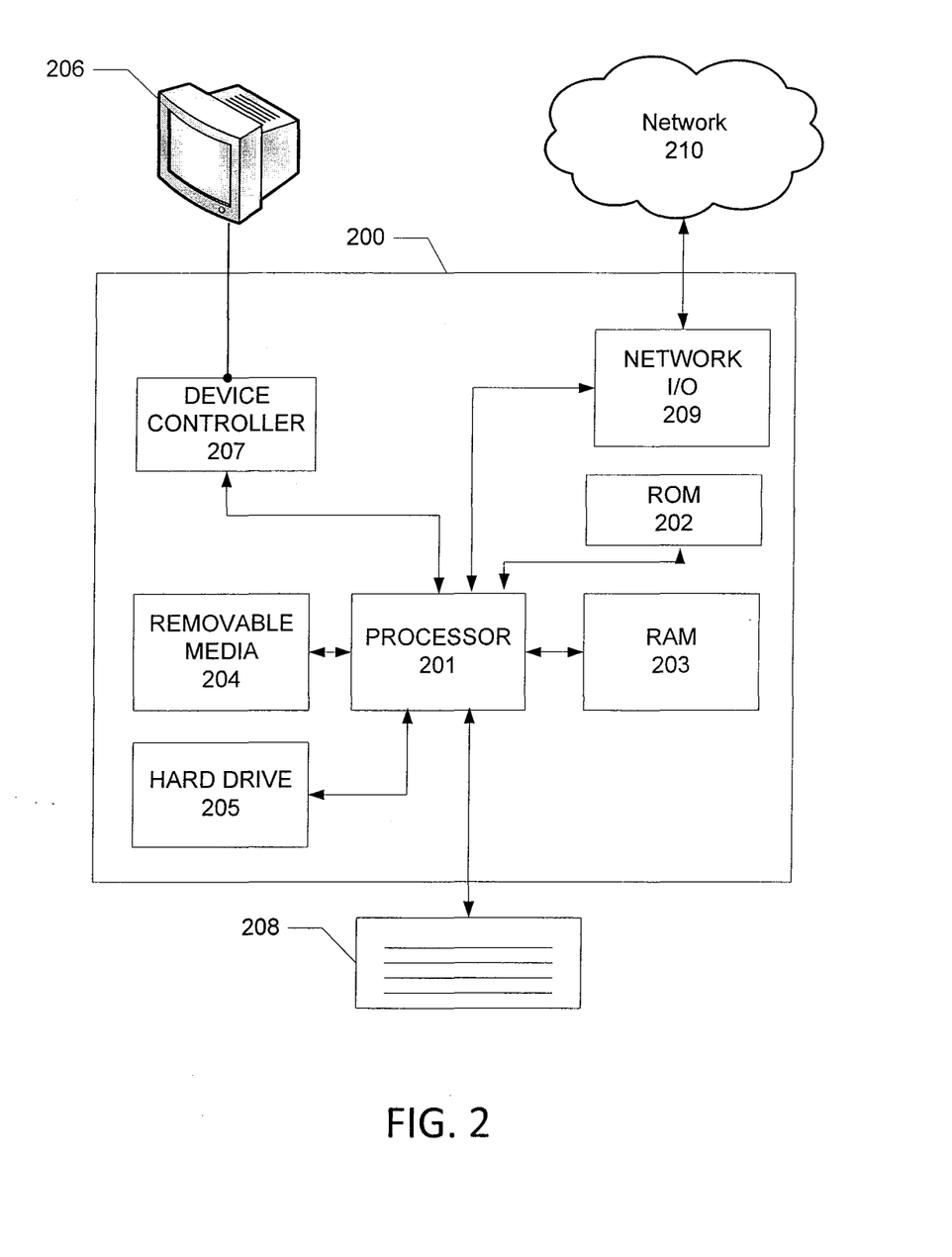
FIG. 2 illustrates an example hardware platform on which the various features of the disclosure may be implemented.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

The FIG. 2 example is an example hardware configuration. Modifications may be made to add, remove, combine, divide, etc. components as desired. Additionally, the components illustrated may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

As discussed above, the central office of an information distribution network may transmit information downstream to various user devices. The transmitted information may include content for consumption (e.g., playback, viewing, listening, display, storage, etc.) by a user via user equipment, such as a gateway interface device gateway interface device 111 of FIG. 1) and/or other computing device (e.g., televisions 112, additional STBs 113, personal computers 114, laptop computers 115, wireless devices 116 of FIG. 1). To assist in providing the content to a user, a content provider may implement in their distribution network an information distribution management system that includes one or more information distribution management devices (e.g., one or more servers and/or other devices) configured to perform various processes related to managing the providing of content to the user equipment (e.g., user device).

For example, such managing may include requesting, creating and handling various sessions (e.g., user sessions, multicast group sessions, cache fill sessions, quality of service sessions); managing transmission of the content (e.g., managing the establishing of transmissions providing unicast content, such as on demand, and linear content, such as multicast content); monitoring usage data of the distribution network, and/or handling requests and notifications from user equipment. As another example, managing may include managing the content discovery, content locating and content delivery processes of the distribution network. In some embodiments, the managing may be implemented using IP (Internet Protocol) and/or HTTP (Hypertext Transfer Protocol) based processes. For example, communication between various devices may be performed using HTTP and/or IP packets. In one example, a session manager server may locate a streaming server and/or a multicast address for a particular content item, and may notify user equipment of the streaming server and/or multicast address for the particular content item using HTTP packets. The user equipment may receive the particular content item (via a unicast signal and/or a multicast signal) by receiving HTTP packets that include fragments of the content item and metadata identifying the streaming server and/or multicast address. In some embodiments, communication between devices may use only a single protocol (e.g., only HTTP packets or IP packets). Content items may also be transmitted using the single protocol (e.g., HTTP or IP packets including fragments of content items). Details of these processes, and others, will be discussed in further detail below.

Content discovery processes may include supporting the discovery of content the various content items being provided by a distribution network. For example, content discovery processes may support the discovery of content items for multicast and/or linear transmission. In some embodiments, content discovery and the various related processes may use an HTTP-based approach (e.g., communication is via HTTP and/or IP packets) that includes communication between user equipment, application servers, and other various servers of the central office.

Content locating processes may include supporting the setup of various sessions and managing the resources of the information distribution network. In some embodiments, content locating processes may enforce entitlement procedures and digital rights management (DRM) licenses. Additionally, in some embodiments, content locating and the various related processes may use an HTTP based approach that includes communication between user equipment, session manager servers, and other servers of the central office.

Content delivery processes may include supporting the streaming of the content items from various servers, such as a streaming server of the central office. In some embodiments, content delivery processes may enable user equipment to receive multicast signals (e.g., signals directed at a plurality and/or group of user equipment) and/or receive unicast signals (e.g., signals directed at a specific user device). Additionally, in some embodiments, content streaming and the various related processes may use an HTTP based approach that includes communication between user equipment, content servers, and other servers of the central office.

Figure 3:
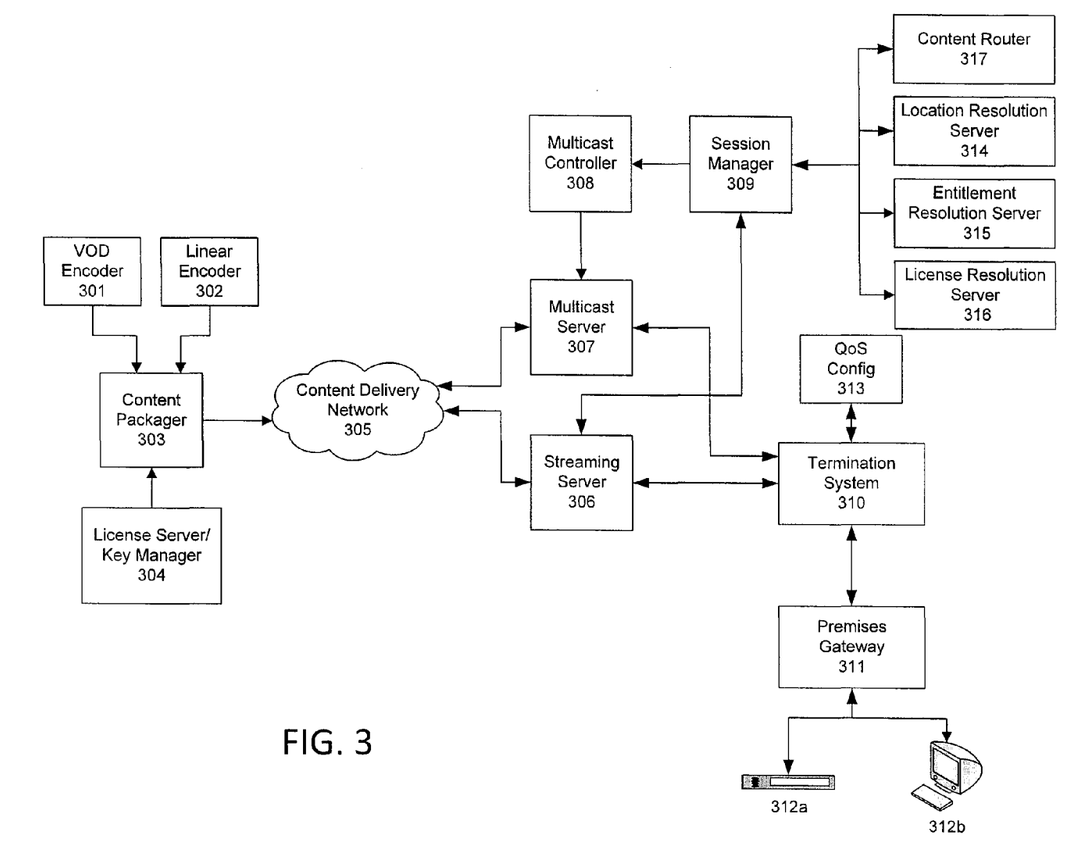
FIG. 3 illustrates an example system diagram on which features of the disclosure may be implemented.

FIG. 3 illustrates an example system of components that may be implemented on the network 100, and which may be used to implement various features described herein to supply various content to users. The system may include one or more sources of the content. For example, in the case of video content (e.g., audiovideo content), there may be one or more video on demand (VOD) content encoders 301, each of which may include an application server (such as application server 107) configured to store video content such as movies, television shows, video clips, musical videos, etc.

The encoders 301 may include encoding hardware and/or software to provide content in a desired format, such as MPEG.

The system may also include one or more linear content encoders 302. Linear content encoders 302 may be similar to VOD content encoders 301, but may further be configured to supply content according to a predetermined schedule, as opposed to on demand. For example, the NBC content service may have one or more linear encoders 302 configured to supply a video stream of NBC scheduled video programming (e.g., the nightly news) at the appropriate time.

The system may include one or more content packagers 303. In an embodiment, packager 303 may be included in premises gateway 311. The content packager 303 may be another application server, but configured to receive content and package it for delivery to users. This packaging may include, for example, reformatting the content (e.g., video resolution conversion, coder/decoder conversion, audio conversion, compression altering, synchronization, etc.), and segmenting the content (e.g., a two-hour movie may be divided into a plurality of discrete time segments for delivery). In addition, packaging may include encrypting the content.

The system may include a license server/key manager 304, which may be a server configured to manage content entitlement. For example, the manager 304 may contain encryption and/or decryption keys, and can supply those keys to content packager 303 for use in encrypting content for delivery. The manager 304 may also store information identifying users, and the level(s) of service to which the users are entitled, and may make determinations as to whether a particular user is actually entitled to receive a piece of requested content.

Content delivery network 305 may be any desired type of communication network, such as network 109. The network 305 may span a large geographic area, and may be used to disseminate content or make content accessible. For example, some content may be supplied to a streaming server 306. The streaming server 306 may be a server configured to receive packaged content, and generate a unicast stream of that content for delivery to a user.

Another example may be a multicast server 307. Like the streaming server, multicast server 307 may also be configured to generate a stream of packaged content. However, the multicast server's stream may be a multicast stream, configured to be received by a plurality of recipient users.

The multicast server 307 may operate at the direction of a multicast controller 308, which may in turn communicate with a session manager 309 to establish multicast sessions for the delivery of various pieces of content. Session Manager 309 may be configured to manage one or more sessions of the distribution network by interfacing with various devices in the distribution network and communicating session information with the various devices. In some embodiments, the sessions that are managed by session manager 309 may include a user session, a multicast group session, a cache fill session, and/or a QoS flow session. For example, a user session may be created upon a user device requesting content, and may include information related to the requested content and the entitlements of the user device. A multicast group session may be created upon a user device joining a multicast group of a particular group of user equipment, and may include information related to the multicast group. A cache fill session may be created upon a user device requesting a cache fill of a particular content item being transmitted (e.g., multicast or unicast), and may include information related to the user device and the particular content item. A QoS flow session may be created based on the initiation of a transmission to a user device, and may include information related to the QoS profile being enforced and the user device. Details of these sessions will be discussed in further detail below.

The servers 306/307 may communicate with a termination system 310 (e.g., termination system 104) to ultimately deliver the content to a user's premises, or to a premises gateway 311 that can, in turn, supply content to various pieces of user equipment, such as a set-top box 312a, computer 312b, or any other desired display device or piece of user equipment.

Other servers may be used as part of this delivery as well. For example, a quality of service (QoS) configuration manager 313 may be used to determine quality of service parameters for a given stream. As another example, a location resolution server 314 may contain geographic identification information for the various servers 306/307, termination servers 310, packagers 303, and other components in the system, and may be configured to determine which device(s) are closest geographically to a requesting user device. Location resolution server 314 may be configured to determine location information for a particular user device. For example, in some embodiments, location resolution server 314 may receive a location request identifying a particular user device, determine geographic information (e.g., latitude and longitude) for the user device, determine whether the user device is on-network or off-network and transmit the information to the session manager 309. A user device being on-net may include user devices connected via termination systems (e.g., termination system 310) of the content provider. A user device being off-net may include user devices (e.g., user equipment) connected via third party distribution networks that are not under the management or control of the session manager 309 and multicast controller 308.

An entitlement resolution server 315 may be configured to validate a user device's entitlement to a particular content item. For example, in some embodiments, entitlement resolution server 315 may receive a validate entitlement request identifying a content item; determine whether a user device has a valid entitlement to the content item, based on user session information, content item information, and location information of the user device; and transmit the information indicating the result of the determination to the session manager 309. Entitlement resolution server 315 may also be configured to validate a user device's license to a particular content item. For example, in some arrangements, entitlement resolution server 315 may receive a validate license request identifying a content item, determine whether a user device has a valid license to the content item, based on user session information and content item information, and transmit information indicating the result of the determination to a license resolution server 316.

License resolution server 316 may be configured to distribute licenses and/or distribute decryption and encryption keys. For example, in some embodiments, license resolution device 316 may distribute encryption keys to content packager 303 (or to license server/key manager 304). The license resolution server may also receive a license request from a user device; transmit a request to the entitlement resolution device to validate the license; and upon receiving an indication that the user device has a valid license, and transmit the license and one or more decryption keys to the user device.

In an aspect of the disclosure, content packager 303 may receive content in a mezzanine or universal file format to be reformatted, encoded, and segmented based on a users request for content. The mezzanine or universal file format may comprise, for example, a MPEG-2 single program transport stream or a similar transport stream as described in ISO 13818-1. For instance, in an embodiment of the disclosure content packager 303 may be functionally positioned at the ingress of content delivery network 305. Positioning content packager 303 at the ingress of content delivery network 305 may allow for caching of the output stream of content packager 303 for fulfilling other user requests for the same content accessed by similar device types. Caching the output of content packager 303 upstream of content delivery network 305 may reduce overall load on content packager 303. In addition, caching the output upstream of content delivery network 305 may enable the cached content to be available to a larger pool of users that may be geographically distant. For instance, numerous users utilizing a particular smart phone may request a recent episode of a television series for viewing. These users may be geographically widespread as some may be located in Chicago, Ill. while others may be located in Tampa, Fla. The output requested from the first requesting user may be cached so that the next similar device type request from a user may be delivered from cache reducing overall load on content packager 303.

Figure 4:
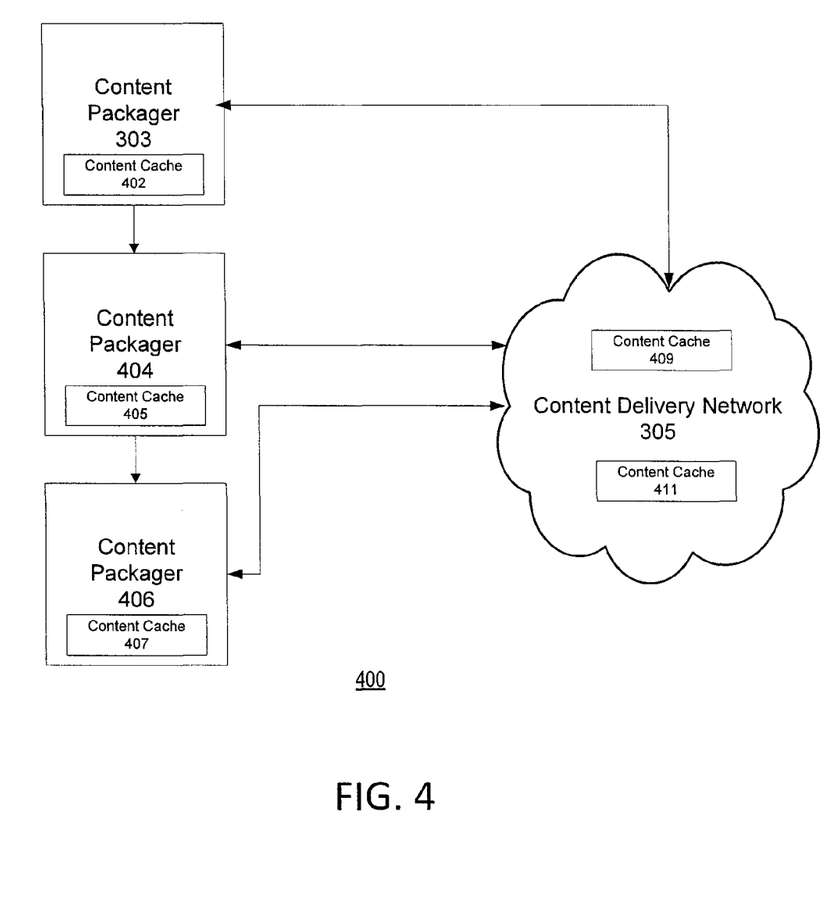
FIG. 4 illustrates a detailed portion of the system diagram of FIG. 3 in which features of the disclosure may be implemented.

FIG. 4 illustrates content cache 402 which may be used to store output of content packager 303. Those skilled in the art will realize that content cache 402 may also be supplemented or physically placed within content delivery network 305. In addition, content cache 402 trough 409 may be part of a multi-tier caching structure. In an embodiment, each content cache 409-411 may be utilized for different geographical regions.

In FIG. 4, distribution system 400 may include one or more content packagers 303, 404, and 406. Each content packager 303, 404, and 406 may also be associated with different content caches 402, 405, and 407. In addition, content caches may be located across content delivery network 305 such as content caches 409 and 411. Based on a received device type, packaging of the requested content may be routed to the appropriate content packager 303, 404, and 406. Those skilled in the art will realize that additional content packagers 303 may be utilized to support different requesting device types. Each content packager 303 based on received or determined requesting device type may reformat the content, encrypt the content, and segment the content.

Figure 5:
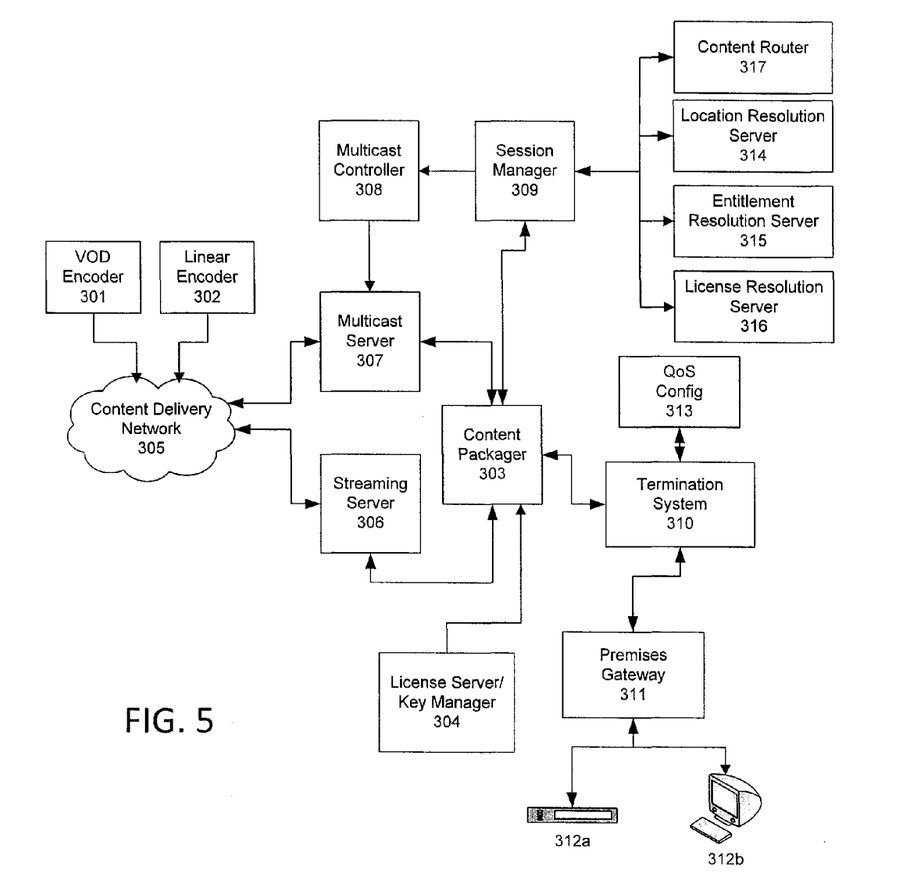
FIG. 5 represents another exemplary system diagram on which features of the disclosure may be implemented.

In another aspect of the disclosure, content packager 303 may be functionally positioned at the egress of content delivery network 305 as shown in FIG. 5. Positioning content packager 303 at the egress of content delivery network 305 may allow all content delivered through the content delivery network 305 to be in a mezzanine or universal file format. In addition, a content packager 303 positioned at the egress of the content delivery network 305 may be very close to termination system 310 and premises gateway 311 which may support session based encryption for increased content security.

Location resolution server 314 may be configured to determine location information for a particular user device. For example, location resolution server 314 may determine a requesting location for a user device requesting content delivery. The determined location of the requesting device may be used to determine an optimal content packager 303 and streaming server 306 to complete content delivery. In addition, alternative content packagers 303 and streaming servers 306 may be identified and/or utilized based on availability and utilization of all content packagers 303 and streaming servers 306. In an embodiment, an IP address or GPS data for a requesting device may be used to determine device location. For instance, some pieces of user equipment (312a and 312b) may contain GPS units. These devices may upon setup specify their coordinates such as longitude and latitude to allow the system to know the exact location of the user device.

Content Router 317 may be configured to determine an optimal content delivery path for delivery of requested content. In an embodiment, session manager 309 along with content router 317 may consider specifications and utilization of content packagers 303 and content streamers 306 to determine an optional content delivery path. In another embodiment, based on the determined device types both ingress 303 and egress content packagers 303 may be utilized to provide optimal content delivery.

Session manager 309 may also in some aspects of the disclosure communicate with premises gateway 311 in order to determine the devices types for various user equipment, e.g., CPE devices, such as 312a and 312b so that the optimal content packager 303 and content streamer 306 may be determined. For instance, premises gateway 311 may forward a setup session request from a CPE device to session manger 309. The setup session request may be used to validate a content purchase and return resource information to the CPE so that CPE can 1) obtain a list of content to access from a selected streaming server; 2) obtain a content manifest file; and 3) receive a DRM license and decryption key.

Upon receiving a request for content, session manager 309 may retrieve requested content based on content packager 303 and content streamer 306 capabilities and configurations. Content packager 303 and content streamer 306 may be preselected at session startup for a particular CPE device. The session manger 309 and the content router 317 may provision target content format to either an ingress or egress content packager 303. Upon session startup for content consumption, a requesting user device may pull the content file and/or fragment from the content origin via content packager 303. The content packager 303 may retrieve the appropriate packaging metadata and encryption keys and begin the just-in-time packaging process.

Table 1 illustrates an example of different media players that may be used on different devices along with their associated codecs and other properties which may be considered by content packager 303. Table 1 is merely illustrative and not meant to be an exhaustive list of devices and their associated properties.

TABLE 1

| Player | Codec | Container | Transport | Stream Control | Rate Adaptation |
| --- | --- | --- | --- | --- | --- |
| QuickTime | MPEG-4 AVC/AAC | MP4 | RTF over UDP/TCP | RTSP | No |
| Flash | MPEG-4 AVC/AAC | MP4 | Streaming: RTMP<br>Progressive: HTTP | N/A | Streaming: Yes<br>Progressive: No |

TABLE 1-continued

| Player | Codec | Container | Transport | Stream Control | Rate Adaptation |
|---|---|---|---|---|---|
| MS Window Media | VC-1 | ASF | RTF over UDP/TCP | RTSP | No |
| MS Silverlight | MPEG-4 AVC/AAC | MP4 (fragmented) | HTTP | HTTP (extension) | Yes |
| MS Mediaroom | MPEG-4 AVC/AAC | MPEG-2 Transport | RTP/UDP (Linear) RTF/HTTP (VOD) | HTTP | Yes |
| Move | On2 VP7 | N/A | HTTP | HTTP | Yes |
| Real | RealVideo & RealAudio | RealVideo & RealAudio | RDT (Proprietary) | RTSP | No |
| DLNA | Video: MPEG-2, MPEG-4 AVC Audio PCM, AC-3 | MPEG-2 Transport MP4 | HTTP RTP over UDP (optional) | HTTP (extension)-- proposed | No |
| DVB | MPEG-2/AC-3 MPEG-4 AVC/AC-3 | MPEG-2 Transport MP4 Container | MPEG-2 transport (embedded) | N/A | No |
| Apple HTTP Live | MPEG-4 AVC/AAC | MPEG-2 Transport | HTTP | HTTP | Yes |

The content packager 303 may reformat, encode, and segment the requested content for delivery to the requesting user device. The post packaged output content file and/or fragment may be cached at content delivery network 305.

Figure 6:
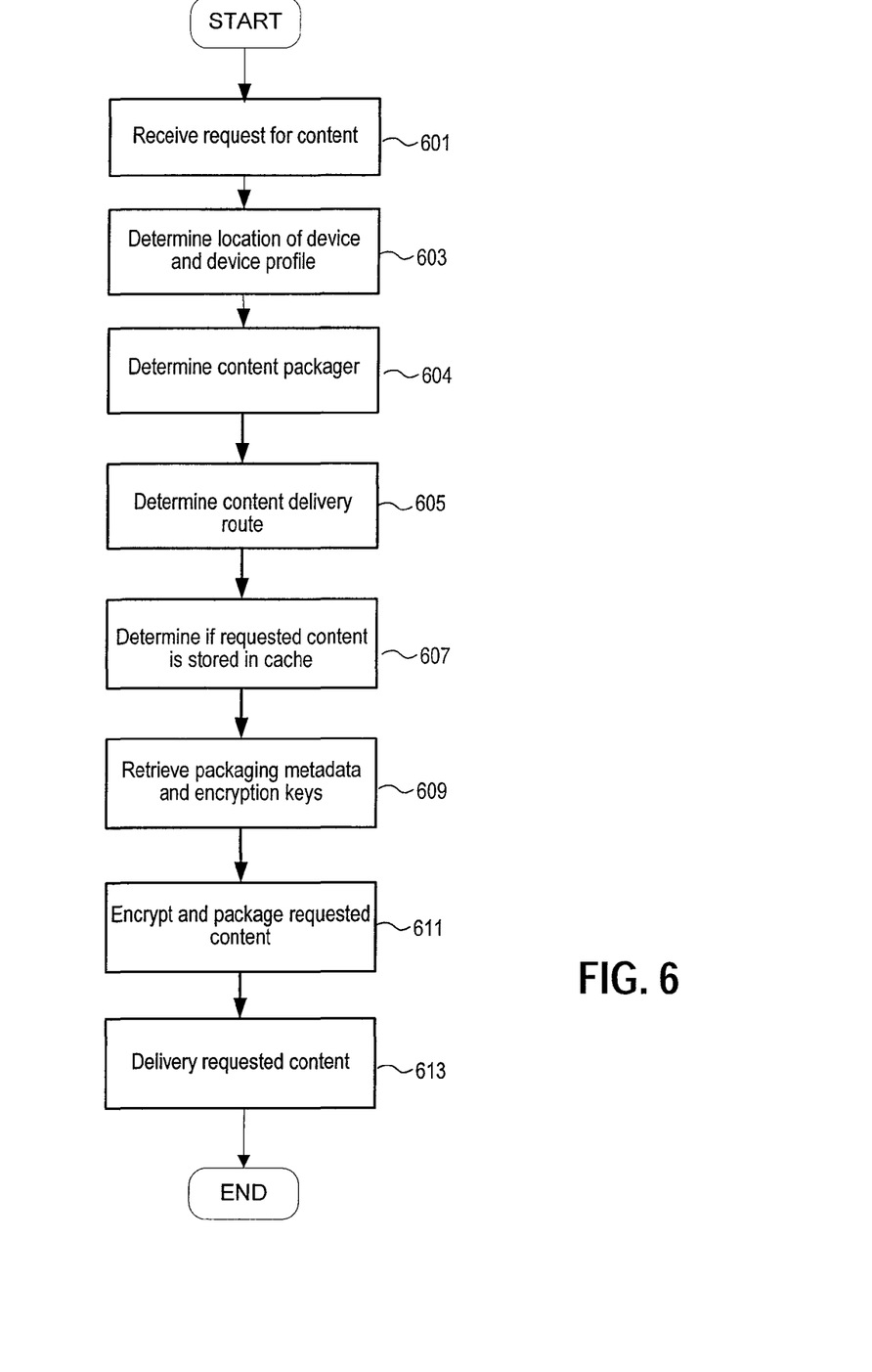
FIG. 6 illustrates an exemplary flow diagram in which content may be received in accordance with an aspect of the disclosure.

FIG. 6 illustrates an exemplary flow diagram in which dynamic content, which may be referred to as just-in-time content, may be received by a requesting device in accordance with an aspect of the disclosure. In FIG. 6, at step 601 a content request may be received from a requesting device. Next, in step 603 a device geographical location and device profile may be determined for the requesting device. In an embodiment, the device profile may be determined from received device type information from the request or requesting device.

At least one content packager 303 may be determined in step 604 for providing content to the requesting device. In an embodiment, the determined at least one content packager 303 may support a media player included in the requesting device as indicated in a device profile, or may support format of the content needed by the requesting device.

In step 605, a content delivery route may be determined. The content delivery route may be determined from various different content routing routines. In an alternative embodiment, the content delivery route may be determined before a content packager is determined.

Figure 7:
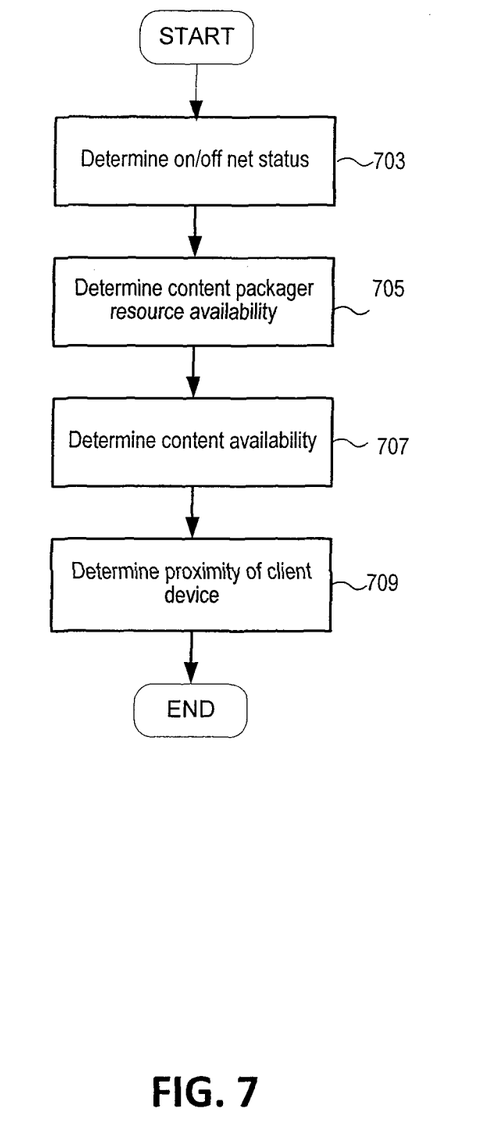
FIG. 7 illustrates another exemplary flow diagram in which a content delivery route may be delivered to in accordance with an aspect of the disclosure.

In an embodiment, a content delivery route may be determined in accordance with the exemplary flow diagram shown in FIG. 7. In FIG. 7, at step 703 a determination may be made as to whether the requesting device is on/off the content provider's network. Next, in step 705 resource availability for each determined at least one content packager may be determined.

In step 707, availability of the requested content may be determined. Next, in step 709 geographical proximity of a requesting device to a determined content packager may be determined to use as a factor in selecting a content delivery route.

Referring again to FIG. 6, in step 607, a discovery process may be executed to determine if the requested content resides in cache located on a determined content delivery route. If the requested content is stored in cache along a determined content delivery route, then the discovered requested content may be delivered to the requesting device from cache. However, if the requested content is not stored along the content delivery route, then the process may continue to retrieve and package requested content.

In an alternative embodiment, the discovery process may include other cache not located on the content delivery path. In an embodiment, a discovery process may include generating a list of content packagers throughout a network system that includes the requested content in cache. In an embodiment, the list may be ranked and evaluated for fulfilling different client content requests.

In step 609, packaging metadata and encryption keys may be retrieved for use in fulfilling the content request. Next, in step 611 the requested content may be packaged and encrypted. The content may delivered to the requesting device along the determined content delivery route in step 613.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

We claim:

1. A method, comprising:
   receiving, by a processor, a content request from a device;
   determining a geographic location of the device;
   generating a list of a plurality of content packagers capable of packaging content associated with the content request;
   ranking the list based on proximities of the plurality of content packagers to the geographic location of the device; and
   based on the ranked list, causing packaging and delivery of the content by a selected one of the plurality of content packagers to the device, wherein the causing packaging comprises causing reformatting and segmenting of the content.

2. The method of claim 1, further comprising: causing encrypting of the content associated with the content request.

3. The method of claim 1, further comprising:

determining a content delivery route, wherein the causing delivery of the content by the selected one of the plurality of content packagers comprises causing delivery according to the content delivery route.

4. The method of claim 1, further comprising: determining a device profile indicating device capabilities for the device.

5. The method of claim 4, further comprising: determining the one of the plurality of content packagers based on the device profile.

6. The method of claim 1, further comprising:
causing the content to be provided in a mezzanine format to the selected one of the plurality of content packagers.

7. A method, comprising:
generating a list of a plurality of content packagers capable of packaging content associated with a content request received from a device;
ranking the list based on proximities of the plurality of content packagers to a geographic location of the device; and
based on the ranked list, causing packaging and delivery of the content by one of the plurality of content packagers to the device, wherein the causing packaging comprises causing reformatting and segmenting of the content.

8. The method of claim 7, further comprising: causing encrypting of the content associated with the content request for delivery to the device.

9. The method of claim 7, further comprising:
determining a content delivery route, wherein the causing delivery of the content by the one of the plurality of content packagers comprises causing delivery according to the content delivery route.

10. The method of claim 9, wherein the determining the content delivery route further comprises determining availability of content streamers along the content delivery route.

11. The method of claim 10, further comprising:
selecting a content streamer from the determined available content streamers for delivery of the content associated with the content request.

12. The method of claim 9, wherein the determining the content delivery route further comprises determining at least one of an on and off network status.

13. The method of claim 9, wherein the determining the content delivery route further comprises determining proximity of content streamers to the device.

14. The method of claim 7, further comprising: determining a device profile indicating device capabilities for the device.

15. The method of claim 14, further comprising:
determining, by a processor, the one of the plurality of content packagers based on the device profile.

16. The method of claim 7, further comprising:
causing the content to be provided in a mezzanine format to the one of the plurality of content packagers.

17. An apparatus comprising:
at least one processor; and
at least one memory having stored therein machine executable instructions, the at least one memory and the machine executable instructions configured to, with the at least one processor, cause the apparatus to:
receive a content request from a device;
generate a list of a plurality of content packagers capable of packaging content associated with the content request;
rank the list based on proximities of the plurality of content packagers to a geographic location of the device; and
based on the ranked list, causing packaging and delivery of the content by one of the plurality of content packagers to the device, wherein the causing packaging comprises causing reformatting and segmenting of the content.

18. The apparatus of claim 17, wherein the one of the plurality of content packagers comprises an ingress content packager.

19. The apparatus of claim 17, wherein the apparatus comprises a gateway device.

20. The apparatus of claim 17, the at least one memory and the machine executable instructions further configured to, with the at least one processor, cause the apparatus to:
cause the content to be provided in a mezzanine format to the one of the plurality of content packagers.

* * * * *

UNITED STATES PATENT AND TRADEMARK OFFICE
CERTIFICATE OF CORRECTION

PATENT NO. : 9,456,226 B2  
APPLICATION NO. : 13/496338  
DATED : September 27, 2016  
INVENTOR(S) : Weidong Mao et al.

Page 1 of 2

It is certified that error appears in the above-identified patent and that said Letters Patent is hereby corrected as shown below:

On the Title Page

Column 1, (76) Inventors, Line 2:
After "PA (US)", please insert --¶(73) Assignee: Comcast Cable Communications, LLC, Philadelphia, PA (US)--

In the Specification

Column 1, Background, Line 47:
Delete "sane" and insert --same--

Column 3, Detailed Description, Line 7:
Delete "white" and insert --while--

Column 3, Detailed Description, Line 24:
Delete "front" and insert --from--

Column 3, Detailed Description, Line 27:
Delete "area" and insert --area,--

Column 4, Detailed Description, Line 31:
Delete "of" and insert --of,--

Column 5, Detailed Description, Line 53:
After "device", (First Occurrence) insert --(e.g.,--

Column 6, Detailed Description, Line 28:
Delete "the" and insert --for--

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,456,226 B2

Column 8, Detailed Description, Line 21:
Delete "servers" and insert --system--

Column 9, Detailed Description, Line 31:
Delete "trough" and insert --through--

Column 10, Detailed Description, Line 35:
Delete "manger" and insert --manager--

Column 10, Detailed Description, Line 46:
Delete "manger" and insert --manager--

Column 10, Detailed Description, Table 1, Line 2:
Delete "RTF" and insert --RTP--

Column 11-12, Detailed Description, Line 3, Table 1:
Delete "RTF" and insert --RTP--

Column 11-12, Detailed Description, Line 6, Table 1:
Delete "RTF/HTTP" and insert --RTP/HTTP--